United States Patent
Coignet et al.

(10) Patent No.: US 10,315,184 B2
(45) Date of Patent: Jun. 11, 2019

(54) ADSORBENT-LOADED BEADS FOR HIGH TEMPERATURE ADSORPTION PROCESSES

(71) Applicant: L'Air Liquide, Societe Anonyme pour l'Etude et l'Exploitation des Procedes Georges Claude, Paris (FR)

(72) Inventors: Philippe A. Coignet, Bear, DE (US); Dean W. Kratzer, Warwick, MD (US); Sudhir S. Kulkarni, Wilmington, DE (US); Edgar S. Sanders, Jr., Newark, DE (US)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 15/396,644

(22) Filed: Apr. 17, 2017

(65) Prior Publication Data

US 2018/0297011 A1    Oct. 18, 2018

(51) Int. Cl.
*B01J 20/26* (2006.01)
*B01J 20/22* (2006.01)
*B01J 20/08* (2006.01)
*B01J 20/10* (2006.01)
*B01J 20/20* (2006.01)
*B01J 20/28* (2006.01)
*B01J 20/16* (2006.01)

(52) U.S. Cl.
CPC ............ *B01J 20/262* (2013.01); *B01J 20/08* (2013.01); *B01J 20/10* (2013.01); *B01J 20/165* (2013.01); *B01J 20/20* (2013.01); *B01J 20/22* (2013.01); *B01J 20/226* (2013.01); *B01J 20/26* (2013.01); *B01J 20/267* (2013.01); *B01J 20/2803* (2013.01); *B01J 20/28011* (2013.01); *B01J 20/28023* (2013.01); *B01J 20/28026* (2013.01)

(58) Field of Classification Search
CPC ........... B01J 20/26; B01J 20/262; B01J 20/22
USPC ....................................................... 502/401
See application file for complete search history.

(56) References Cited

U.S. PATENT DOCUMENTS

| | | |
|---|---|---|
| 5,139,668 A | 8/1992 | Pan et al. |
| 5,314,923 A * | 5/1994 | Cooke ............... B01J 20/26 |
| | | 428/402 |
| 5,401,706 A | 3/1995 | Fischer |
| 5,693,230 A | 12/1997 | Asher |
| 6,451,723 B1 | 9/2002 | Gaita et al. |
| 6,500,233 B1 | 12/2002 | Miller et al. |
| 6,592,651 B2 | 7/2003 | Jain et al. |
| 7,077,891 B2 | 7/2006 | Jaffe et al. |
| 7,592,284 B2 | 9/2009 | Zaki et al. |
| 8,133,308 B2 | 3/2012 | Lively et al. |
| 8,257,474 B2 | 9/2012 | Lively et al. |
| 8,377,172 B2 | 2/2013 | Koros et al. |
| 8,673,059 B2 | 3/2014 | Leta et al. |
| 9,050,582 B2 | 6/2015 | Barrett et al. |
| 9,446,344 B2 | 9/2016 | Koch et al. |
| 2010/0313755 A1 | 12/2010 | Koros et al. |
| 2012/0048109 A1 | 3/2012 | Chinn et al. |
| 2012/0247330 A1 | 10/2012 | Chang et al. |
| 2013/0255488 A1 | 10/2013 | Chang et al. |
| 2013/0305920 A1 | 11/2013 | Yang et al. |
| 2013/0340620 A1 | 12/2013 | Sundaram |

FOREIGN PATENT DOCUMENTS

| | | |
|---|---|---|
| EP | 1 323 468 | 7/2003 |
| FR | 3 002 939 | 9/2014 |
| WO | WO 2012 118 759 | 9/2012 |

OTHER PUBLICATIONS

Akhtar, et al., "Structuring adsorbents and catalysts by processing of porous powders," Journal of the European Society, 34 (2014), pp. 1643-1666.
Bhandari, et al., "Dual layer hollow fiber sorbents: Concept, fabrication and characterization," Separation and Technology, 104 (2013), pp. 68-80.
Jeffs, et al., "A polymer of intrinsic microporosity as the active binder to enhance adsorption/separation properties of hollow fibres," Microporous and Mesoporous Materials, 170 (2013), pp. 105-112.
Labreche, "Post-spinning infusion of poly(ethyleneimine) into polymer/silica hollow fiber sorbents for carbon dioxide capture," Chemical Engineering Journal, 221 (2013), pp. 166-175.
Lively, et al., "CO2 sorption and desorption performance of thermally cycled hollow fiber sorbents," International Journal of Greenhouse Gas Control, 10 (2012), pp. 285-294.
Lively, et al., "Hollow Fiber Adsorbents for CO2 Removal from Flue Gas," Ind. Eng. Chem. Res., vol. 48, No. 15, 2009, pp. 7314-7324.
Thiruvenkatachari, et al., "Post combustion CO2 capture by carbon fibre monolithic adsorbents," Progress in and Combustion Science, 35 (2009), pp. 438-455. Energy.
International Search Report and Written Opinion for PCT/US2017/069059, dated Apr. 6, 2018.

* cited by examiner

*Primary Examiner* — Edward M Johnson
(74) *Attorney, Agent, or Firm* — Christopher J. Cronin (57) ABSTRACT

A bead comprised of a matrix of at least 50 wt % adsorbent particles and a thermoplastic polymer or a blend of thermoplastic polymers, the thermoplastic polymer or blend of thermoplastic polymers exhibiting a Vicat softening temperature of at least 240° C.

3 Claims, 2 Drawing Sheets

ADSORBENT-LOADED BEADS FOR HIGH TEMPERATURE ADSORPTION PROCESSES

CROSS-REFERENCE TO RELATED APPLICATIONS

None.

BACKGROUND

Field of the Invention

The present invention relates to structured adsorbents for gas separation.

Related Art

Adsorbents are typically shaped as small beads (1-5 mm in diameter) and find widespread use in countless applications, from desiccants for insulated windows to hydrogen purification. Current adsorbent systems, however, include a number of drawbacks.

The packing density of a traditional beaded adsorbent bed is limited by the generally spherical shape of the beads. Specifically, the maximum packing density achievable with perfect spheres of identical diameter is 74%. In reality, within a bed of adsorbent beads a distribution of diameters exists. For example, a ratio of the largest diameter to the smallest diameter is may be around 2:1. Also, beads are not necessarily perfectly spherical, so that often, an average packing density of only as much as 65% is achieved.

Because current beaded adsorbent typically use brittle, clay-based binders, such as bentonite, they are intolerant to friction or impacts and consequently are prone to dusting. Given that current beaded adsorbents are typically intolerant to friction and impacts, it is standard practice to limit the gas velocity seen by the average bead to anywhere between 80 and 90% of the fluidization velocity so that fluidization and dusting are avoided. Because the gas velocity is limited, the flow rates of gas during production and depressurization steps are similarly limited. If the flow rates are limited, the speed at which an adsorbent bed can be depressurized and repressurized is also limited. This is especially true for large PSA systems. Therefore, the throughput of conventional beaded adsorbent beds is limited.

The attrition velocity is an indicator of the maximum gas velocity that the beads of conventional adsorbent beds can be subjected to without exhibiting attrition (i.e., dusting) due to friction and impacts. The attrition velocity is directly linked to the average bead-mass. As the bead mass increases, the attrition velocity increases. Therefore, one way to increase the throughput of a beaded adsorbent bed is to increase the mass of the average bead, or to put it another way, to increase the average diameter of the beads. However, increasing the mass or average diameter of the beads comes at the expense of slower kinetics due to diffusion limitations of gas transport within the beads. This is because, as the mass/diameter of a bead increases, the average path length traveled by a plug of gas from the surface of a bead to an available adsorption site within the bead will also increase.

In order to mitigate some of the above-described drawbacks, some have proposed the use of structured adsorbent beds. As opposed to the discrete structure of a beaded bed, the concept of structured adsorbent bed is to form a rigid and/or fixed adsorbent bed or continuous adsorbent structure so as to eliminate the issues related to fluidization. By doing so, the kinetics can be improved by decreasing the characteristic dimension of the adsorbent structure. As an example, a supported adsorbent layer only 0.1 mm thick can have better kinetics than a similar mass of adsorbent configured as 2 mm beads.

One type of structured adsorbent beds proposed is formed by depositing an adsorbent-containing layer onto a non-absorbent substrate (e.g., an aluminum framework). Commercially available desiccant wheels are a prime example of this approach as described in U.S. Pat. No. 5,401,706. Alternatively, U.S. Pat. No. 8,133,308 proposes a supported sorbent fiber. Specifically, a thin layer of a matrix including adsorbent and cellulose acetate is deposited around the outside diameter of a non-sorbent hollow fiber.

Although kinetics can be improved in structured adsorbent beds using substrate-supported adsorbents, the approach suffers several drawbacks. A first drawback is the cost as more manufacturing steps are involved. A second drawback is a lower effective adsorbent packing density because the space occupied by the support/substrate does not significantly participate in the adsorption process.

Alternatively, adsorbents made of a mixed-matrix of adsorbent/polymer have been proposed in order to increase the packing density. For instance, U.S. Pat. No. 6,451,723 discloses the use of polysulfone (PS) to form mixed-matrix 13X-PS adsorbent structures. Although polymeric binders are preferable to brittle clay-based (or similar brittle binders) for ease of bed forming and handling as well as resistance to mechanical and thermal stress, we are not aware of any thermoplastic polymeric binder-based adsorbents that are fully satisfactory when high temperature activation and/or regeneration are required. More specifically, many common adsorbents can require activation/regeneration temperatures well above 200° C. For example, 5A and 13X zeolites as well as activated alumina can require activation temperatures in excess of 300° C., lithium-based zeolites can require activation temperatures in excess of 400° C., and activated carbon or carbon molecular sieve (CMS) adsorbents can require activation temperatures in excess of even 450° C.

Such high activation temperatures may be necessary in order to reach the full adsorbent capacity for the targeted gas. For example, considering a temperature swing adsorption (TSA) system in a front end purification unit of an air separation unit (ASU), 13X zeolite adsorbent can be used to remove $CO_2$ from air after $H_2O$ removal and prior to sending the purified air stream to the cryogenic part of the process. In order to desorb $H_2O$ molecules from the 13X zeolite, on-site activation of the adsorbent at a temperature of around 300° C. is initially performed. Subsequently, assuming that there is no subsequent contamination of the zeolite by water molecules, lower regeneration temperatures are sufficient to desorb $CO_2$ molecules as part of the normal TSA operation. During the life of the adsorbent within the TSA, periodic regenerations around 300° C. may be performed on-site, such as after a shutdown or upon early $CO_2$ breakthrough.

Therefore, in order to take advantage of all of the benefits brought by polymeric binders, there is a need to develop new formulations for an adsorbent-polymer matrix that can sustain high temperature activation/regeneration.

SUMMARY

A non-flexible polymer-adsorbent bead suited for high-temperature exposure requirement produced by diffusion-driven phase inversion using soluble thermoplastic polymers that can withstand repeated hours-long (10 hr+) high temperature exposures at or above 240° C., preferably at or above 250° C., preferably at or above 270° C., preferably at or above 300° C., preferably at or above 330° C., preferably at or above 360° C., preferably at or above 400° C., the bead contains at least 50 wt % adsorbent.

One or more aspects may be included:

The non-flexible high-temperature-rated adsorbent-polymer matrix of claim 1, which is activated at a temperature inferior to the Tg of the polymeric matrix The non-flexible high-temperature-rated adsorbent-polymer matrix of claim 1, which is activated at a temperature equal to the Tg of the polymeric matrix The non-flexible high-temperature-rated adsorbent-polymer matrix of claim 1, which is activated at a temperature superior to the Tg of the polymeric matrix The non-flexible high-temperature-rated adsorbent-polymer matrix of claim 1, which is activated within its final adsorber vessel The non-flexible high-temperature-rated adsorbent-polymer matrix of claim 1, which is activated outside its final adsorber vessel The non-flexible high-temperature-rated adsorbent-polymer matrix of claim 1, prepared using one or multiple adsorbents, including zeolite(s) (e.g. A, Y, X, CaBaX, LSX such as Li-LSX, Ca-LSX), activated carbon, carbon molecular sieve, activated alumina, silica gel, MOF, etc The non-flexible high-temperature-rated adsorbent-polymer matrix of claim 1, which contains catalyst(s)

The non-flexible high-temperature-rated adsorbent-polymer matrix of claim 1, wherein the polymeric matrix contributes to the capture of the targeted gas by adsorption (e.g. high surface area of the polymeric matrix+ affinity between the polymer surface and the targeted gas)

The non-flexible high-temperature-rated adsorbent-polymer matrix of claim 1, wherein the polymeric matrix contributes to the capture of the targeted gas by absorption (e.g. non-zero solubility of the targeted gas within the polymer matrix)

The non-flexible high-temperature-rated polymer-adsorbent matrix of claim 1, wherein the polymeric matrix facilitates/favors the transport of the targeted gas to the adsorbent particulates over other gaseous species (e.g. hydrophobic polymeric matrix to exclude water vapor)

The non-flexible high-temperature-rated adsorbent-polymer matrix of claim 1, which is coated with a selective or protective layer, during the forming process (i.e. spinning process) or after the forming process The non-flexible high-temperature-rated adsorbent-polymer matrix of claim 1, prepared with soluble thermoplastic polymer(s) of rigid chain type The non-flexible high-temperature-rated adsorbent-polymer matrix of claim 1, prepared with soluble thermoplastic polymer(s) of ladder chain type The non-flexible high-temperature-rated adsorbent-polymer matrix of claim 1, prepared using only one soluble polymer The non-flexible high-temperature-rated adsorbent-polymer matrix of claim 1, prepared using a blend of soluble polymers The non-flexible high-temperature-rated adsorbent-polymer matrix of claim 1, prepared with a polymer dope including one or multiple soluble polymers as well as one or multiple cross-linking agents The non-flexible high-temperature-rated adsorbent-polymer matrix of claim 1, which is exposed to/impregnated with cross-linking agents after the forming/spinning step The non-flexible high-temperature-rated adsorbent-polymer matrix of claim 1, prepared using a blend of soluble and/or insoluble polymers The non-flexible high-temperature-rated adsorbent-polymer matrix of claim 1, prepared using a blend of soluble and insoluble nuances of a same polymer (e.g. different MW, different degree of crystallinity)

The non-flexible high-temperature-rated adsorbent-polymer matrix of claim 1, prepared using a blend of soluble polymer(s) and of its (their) precursors The non-flexible high-temperature-rated adsorbent-polymer matrix of claim 1, prepared using a blend of insoluble polymer(s) and of its (their) soluble precursors The non-flexible high-temperature-rated adsorbent-polymer matrix of claim 1, prepared using inorganic fillers (e.g. carbon fibers, glass fibers)

The non-flexible high-temperature-rated adsorbent-polymer matrix of claim 1, which contains polyaramid(s) (e.g. MPD-I, MPD-IT, DAM-IT) or any derivatives The non-flexible high-temperature-rated adsorbent-polymer matrix of claim 1, prepared with soluble polyaramid(s) (e.g. MPD-I, MPD-IT, DAM-IT) or any derivatives The non-flexible high-temperature-rated adsorbent-polymer matrix of claim 1, prepared using polyaramid(s) precursor(s)

The non-flexible high-temperature-rated adsorbent-polymer matrix of claim 1, which contains polyetherimide(s) (PEI) or any of its derivatives The non-flexible high-temperature-rated adsorbent-polymer matrix of claim 1, prepared with polyetherimide(s) (PEI) or any of its derivatives The non-flexible high-temperature-rated adsorbent-polymer matrix of claim 1, prepared using polyetherimide(s) (PEI) precursors or any of its derivatives' precursors The non-flexible high-temperature-rated adsorbent-polymer matrix of claim 1, which contains polyamide-imide(s) (PAI) or any of its derivatives The non-flexible high-temperature-rated adsorbent-polymer matrix of claim 1, prepared with polyamide-imide(s) (PAI) or any of its derivatives The non-flexible high-temperature-rated adsorbent-polymer matrix of claim 1, prepared using polyamide-imide(s) (PAI) precursors or any of its derivatives' precursors The non-flexible high-temperature-rated adsorbent-polymer matrix of claim 1, which contains Polybenzimidazole (FBI) or any of its derivatives The non-flexible high-temperature-rated adsorbent-polymer matrix of claim 1, prepared with Polybenzimidazole (FBI) or any of its derivatives The non-flexible high-temperature-rated adsorbent-polymer matrix of claim 1, prepared using Polybenzimidazole (FBI) precursors or any of its derivatives' precursors The non-flexible high-temperature-rated adsorbent-polymer matrix of claim 1, which contains Polybenzoxazole (PBO) or any of its derivatives The non-flexible high-temperature-rated adsorbent-polymer matrix of claim 1, prepared with Polybenzoxazole (PBO) or any of its derivatives The non-flexible high-temperature-rated adsorbent-polymer matrix of claim 1, prepared using Polybenzoxazole (PBO) precursors or any of its derivatives' precursors The non-flexible high-temperature-rated adsorbent-polymer matrix of claim 1, which contains Polybenzothiazole (PBT) or any of its derivatives The non-flexible high-temperature-rated adsorbent-polymer matrix of claim 1, prepared with Polybenzothiazole (PBT) or any of its derivatives The non-flexible high-temperature-rated adsorbent-polymer matrix of claim 1, prepared using Polybenzothiazole (PBT) precursors or any of its derivatives' precursors The non-flexible high-temperature-rated adsorbent-polymer matrix of claim 1, prepared using cross-linker agents The non-flexible high-temperature-rated adsorbent-polymer matrix of claim 1, prepared by subjecting the adsorbent-polymer matrix to cross-linking reactions during the adsorbent activation step The non-flexible high-temperature-rated adsorbent-polymer matrix of claim 1, prepared by:
  Forming a polymeric dope by mixing a soluble polymer in a solvent system
  Blending the resulting polymeric dope with an adsorbent powder
  Degassing the resulting adsorbent-polymeric dope
  Extruding the adsorbent-polymeric dope through a spinneret or die
  Coagulating the extrudate using a coagulant medium so as to remove the polymer's solvent and solidify the matrix adsorbent-polymer
  Further extracting any remaining solvent still present in the extrudate after coagulation
  Subjecting the extrudate to a high-temperature activation step (e.g. 240° C.+, 250° C.+, 270° C.+, etc)
    The non-flexible high-temperature-rated adsorbent-polymer matrix of claim 1, prepared by:
  Forming a polymeric dope by mixing a soluble polymer in a solvent system
  Blending the resulting polymeric dope with an adsorbent powder
  Degassing the resulting adsorbent-polymeric dope
  Extruding the adsorbent-polymeric dope through a spinneret or die
  Coagulating the extrudate within a coagulant bath so as to remove the polymer-solvent and solidify the matrix adsorbent-polymer
  Exposing the formed extrudate to a second solvent system containing a cross-linking agent
  Washing the bead
  Subjecting the high-temperature-rated adsorbent-polymer matrix to a high-temperature activation step (e.g. 240° C.+, 250° C.+, 270° C.+, etc)

The non-flexible high-temperature-rated adsorbent-polymer matrix of claim 1, prepared by:
  Forming a polymeric dope by mixing a soluble polymer in a solvent system
  Blending the resulting polymeric dope with an adsorbent powder
  Degassing the resulting adsorbent-polymeric dope
  Extruding the adsorbent-polymeric dope through a spinneret or die
  Coagulating the extrudate within a coagulant bath so as to remove the polymer-solvent and solidify the matrix adsorbent-polymer
  Exposing the formed extrudate to a second solvent system containing one or multiple polymer precursors
  Washing the extrudate with a solvent in which both the extruded-polymer and the polymer precursor are insoluble
  Subjecting the high-temperature-rated adsorbent-polymer matrix to a high-temperature activation step (e.g. 240° C.+, 250° C.+, 270° C.+, etc)

The non-flexible high-temperature-rated adsorbent-polymer matrix of claim 1, is prepared by:
  Forming a polymeric dope by mixing a soluble polymer in a solvent system containing a specific salt so as to transform/denature a zeolite adsorbent by ionic exchange
  Blending the resulting polymeric dope with a zeolite powder
  Degassing the resulting adsorbent-polymeric dope
  Extruding the adsorbent-polymeric dope through a spinneret or die
  Coagulating the extrudate within a coagulant bath so as to remove the polymer-solvent and solidify the matrix adsorbent-polymer
  Further extracting any remaining solvent still present in the extrudate after coagulation
  Subjecting the extrudate to a high-temperature activation step (e.g. 240° C.+, 250° C.+, 270° C.+, etc)

The non-flexible high-temperature-rated adsorbent-polymer matrix of claim 1, is prepared by:
  Forming a polymeric dope by mixing a soluble polymer in a solvent system free of salt
  Blending the resulting polymeric dope with a zeolite powder
  Degassing the resulting adsorbent-polymeric dope
  Extruding the adsorbent-polymeric dope through a spinneret or die
  Coagulating the extrudate within a coagulant bath so as to remove the polymer-solvent and solidify the matrix adsorbent-polymer
  Further extracting any remaining solvent still present in the extrudate after coagulation
  Washing multiple times the resulting fiber in an aqueous—or non-aqueous—solution charged with specific ionic species so as to transform/denature the zeolite by ionic exchange
  Subjecting the extrudate to a high-temperature activation step (e.g. 240° C.+, 250° C.+, 270° C.+, etc)

The use of the non-flexible high-temperature-rated adsorbent-polymer matrix of claim 1 to form discrete adsorbent bed (e.g. packed extrudates, packed beads)

The use of the non-flexible high-temperature-rated adsorbent-polymer matrix of claim 1 within an adsorber operated above the attrition velocity The use of the non-flexible high-temperature-rated adsorbent-polymer matrix of claim 1 within a discrete-packing adsorber operated above the attrition velocity The use of the non-flexible high-temperature-rated adsorbent-polymer matrix of claim 1 to form continuous adsorbent bed (e.g. 3D printed bed, monolith)

The use of the non-flexible high-temperature-rated adsorbent-polymer matrix of claim 1 in stationary applications The use of the non-flexible high-temperature-rated adsorbent-polymer matrix of claim 1 in mobile applications where the whole adsorber(s) is (are) moving (e.g. OBOGS)

The use of the non-flexible high-temperature-rated adsorbent-polymer matrix of claim 1 in fluidized bed The use of the non-flexible high-temperature-rated adsorbent-polymer matrix of claim 1 in circulating bed A method for making a reinforced non-flexible high-temperature-rated adsorbent-polymer matrix, the method comprising Forming a polymeric dope by mixing a soluble polymer in a solvent system (e.g. MPD-IT in NMP)

Swelling in the same or different solvent system insoluble polymeric fibers and/or fibrils (e.g. MPD-I or PPD-T fibrils)

Blending the swollen insoluble fibers/fibrils with the polymeric dope so as to form an homogeneous composite dope Simultaneously or sequentially blending the resulting composite polymeric dope with an adsorbent powder Degassing the resulting adsorbent-polymeric dope Extruding the adsorbent-polymeric dope through a spinneret or die Coagulating the extrudate within a coagulant bath so as to remove the polymer-solvent and solidify the matrix adsorbent-polymer Further extracting any remaining solvent still present after coagulation Subjecting the extrudate to a high-temperature activation step (e.g. 240° C.+, 250° C.+, 270° C.+, 330° C.+, 400° C.+)

The non-flexible high-temperature-rated adsorbent-polymer matrix of claim 1, which is suitable for cryogenic/cold operation The use of the non-flexible high-temperature-rated adsorbent-polymer matrix of claim 1 in cryogenic/cold operation The use of the non-flexible high-temperature-rated adsorbent-polymer matrix of claim 1 in axial flow adsorber (or adsorbent bed)

The use of the non-flexible high-temperature-rated adsorbent-polymer matrix of claim 1 in radial flow adsorber (or adsorbent bed)

The use of the non-flexible high-temperature-rated adsorbent-polymer matrix of claim 1 within any adsorption processes: PSA, PTSA, TSA, VSA, VPSA, ESA, RCPSA, RCTSA, etc The use of the non-flexible high-temperature-rated adsorbent-polymer matrix of claim 1 for gas separations, including:
PSA for H2 purification (e.g. SMR)
PSA for CO2 removal from N2
PSA for CO2 removal from CH4
TSA for air de-humidification and de-carbonation (e.g. ASU)
VSA for N2 capture from air (e.g. O2 VSA, O2 PSA, O2 VPSA)

The use of the non-flexible high-temperature-rated adsorbent-polymer matrix of claim 1 for separations in liquid phase (or any other condensed phase)

The use of the non-flexible high-temperature-rated adsorbent-polymer matrix of claim 1 for the separation of vapors The use of the non-flexible high-temperature-rated adsorbent-polymer matrix of claim 1 within supported adsorbents (polymer-adsorbent matrix used to deposit on a substrate)

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

We propose solid beads made via phase inversion of new adsorbent/polymer matrix formulations that are suitable for relatively high temperature activation and/or regeneration of adsorbent-loaded solid. More particularly, we propose the inclusion of a polymeric binder or blend of polymeric binders in adsorbent-loaded beads made by phase inversion that exhibit a Vicat softening temperature ($T_s$) of 220-400° C. and an elongation at break of at least 5%. When such data is know (i.e., it has been measured and reported), such binders or blends of binders typically also exhibit relatively high heat deflection temperatures (HDT) and glass transition temperature ($T_g$). More particularly, the $T_g$, HDT and $T_s$ are typically above the temperatures used for activating or regenerating the adsorbent.

The $T_s$ of a polymer may be determined according to the test procedure outlined in ASTM D 1525. ASTM D 1525 calls for measuring the temperature at which a flat-ended needle penetrates into a portion of the polymer being heated (in a controlled manner) to a specified depth.

The $T_g$ of a polymer is the temperature above which a polymer is in a rubbery state and below which a polymer is in its glassy state. Those of ordinary skill in the art will clearly recognize that the $T_g$ may be determined by differential scanning calorimetry (DSC) using a differential scanning calorimeter.

Those of ordinary skill in the art will clearly recognize that the elongation at break of a polymer may be determined by measuring the length of a portion of the material undergoing testing before stretching it, measuring the length of the portion after stretching, and calculating the ratio of the latter to the former.

The HDT of a polymer may be determined according to the test procedure outlined in ASTM D648. ASTM D648 calls for application of an outer fiber stress, during testing, of either 0.45 MPa or 1.8 MPa and a controlled ramping up of temperature until a deflection of a given amount occurs.

The formulation may include one or more polymeric binders (either individually or as a whole) meeting the requisite $T_s$ and elongation at break. Those of ordinary skill in the art will recognize that the formulation may include two or more polymeric binders in which fewer than all of the polymeric binders have the requisite $T_s$ and elongation at break and one or more of the other binders do not have the requisite $T_s$ and/or the elongation at break, but the blend of polymeric binders as a whole meet the requisite $T_s$ and elongation at break. For those polymeric binders that do not possess both the requisite $T_s$ and the requisite elongation at break, it/they may be included in the formulation for reasons other than suitability for relatively high temperature activation and/or regeneration. For example, they may be included for their tensile strength or pore-forming properties.

The binder or blend of binders meeting the requisite $T_s$ and elongation at break are thermoplastic. A thermoplastic material is a resin that reversibly becomes plastic upon heating and hardens upon cooling. These materials may be distinguished from thermosetting materials which are resins that irreversibly cross-link upon heating.

Thermoplastic binders or blends of thermoplastic binders meeting the requisite $T_s$ and elongation at break render them highly satisfactory for use in forming solid fibers made of the novel formulations. More particularly, they exhibit a satisfactorily high elongation at break allowing the formed fibers to be processed and handled after phase inversion without breaking. A solid fiber meeting made of a formulation containing an adsorbent and a polymeric binder or blend of polymeric binders with a relatively high $T_s$ but an elongation at break of less than 5% will be easily broken during processing and handling after phase inversion. Typically, the thermoplastic binder or blend of thermoplastic binders of the invention exhibit an elongation at break of no less than 7% and typically exhibit an elongation at break of 10-15%.

Because they are made at least partially of a thermoplastic binder, the novel beads are highly satisfactory for use in adsorbent processes operated with relatively fast cycle times, with relatively large adsorbent beds, and/or with relatively high flow rates of gas to be treated. This is because the attrition velocity for thermoplastic binders is much higher than that of conventional beaded adsorbents made from a relatively brittle, non-polymeric binder such as bentonite. More importantly, the novel beads are suitable or relatively high temperature activation and/or regeneration Phase inversion methods useful for forming the beads include diffusion induced phase separation (DIPS) and temperature induced phase separation (TIPS).

For fibers manufactured by DIPS, the selected polymeric binder(s) is(are) are dissolved in a suitable solvent. Suitable solvents include those in which at least 98 wt % of the polymeric binder(s) dissolve. Depending on the polymeric binder(s) chosen and without limiting the scope of the invention, particular solvents include non-polar solvents, polar protic solvents as well as polar aprotic solvents. The latter include N-methyl-2-pyrrolidone (NMP), N,N-Dimethylformamide (DMF), N,N-Dimethylacetamide (DMAc), and N,N-Dimethylsulfoxide (DMSO), and combinations thereof. The solvent may also include an amount of a non-solvent (i.e., one that does not dissolve the polymeric binder(s)), but which is miscible with the solvent, in order to produce a single phase that is close to binodal. The composition of the polymeric binder(s) and solvent is hereinafter referred to as an adsorbent dope.

The adsorbent dope may include one or more salts added to the solvent(s) in order to facilitate the polymer dissolution, such as $CaCl_2$ or LiCl. The combination of solvent(s) and salt(s) should also be selected with the nature of the adsorbent used. For example, it may be desirable to include no salt with certain zeolites in order to prevent any ion exchange processes that would ultimately denature or transform the zeolite. On the other hand, salt(s) may be added so as to intentionally transform the zeolite by ionic exchange while in the adsorbent dope (made up of the polymeric binder(s), solvent(s), optional salts, adsorbent, and optional filler).

The adsorbent dope may include a filler comprising dry-spun fibrils made of a thermoplastic polymer. Fibrils made by dry-spinning inherently exhibit a high degree of crystallinity. Through inclusion of such high crystallinity fibrils, the flexibility of the inventive fibers may be improved.

The adsorbent dope may include a cross-linking agent and cross-linking promoter in order to cross-link the polymeric binder(s) and to thereby increase the mechanical strength and/or the chemical resistance of the resultant beads. In such a case, the cross-linking reaction is performed after extrusion of the bead. One of ordinary skill in the art will recognize that any cross-linking agent known in the field of hollow fiber membranes may be used in the invention. Particular examples of cross-linking promoters include metal oxides and elemental, oligomeric, or polymeric sulfur.

Alternatively, the adsorbent dope may include the cross-linking promoter but not the cross-linking agent. In such a case, the extruded bead may be exposed to the corresponding cross-linking agent by coating it with a composition including the cross-linking agent and subsequently cross-linking it.

Regardless of how the polymeric binder(s) is cross-linked, in a particular embodiment, cross-linking may be carried out on a relatively low molecular weight polymeric binder(s) instead of on a polymeric binder(s) having a molecular weight more typical of those used to form hollow fibers for gas separation membranes. In this manner, chain segments of such a low molecular weight polymeric binder may be cross-linked in order to result in a cross-linked polymeric binder whose overall molecular weight more or less approximates those typically exhibited by polymeric binders used in forming hollow fibers for gas separation membranes.

In an alternative to the inclusion of the already-polymerized polymeric binder (exhibiting the requisite Ts) in the adsorbent dope, the adsorbent dope may include precursors to the polymeric binder (exhibiting the requisite Ts) and the polymeric binder (exhibiting the requisite Ts) is polymerized from the corresponding polymeric precursor during or after phase inversion.

In another alternative, instead of a polymeric binder(s) (exhibiting the requisite Ts) having a molecular weight more typical of those used to form hollow fibers for gas separation membranes, the adsorbent dope may include a relatively low molecular weight polymeric binder(s) and its molecular weight increased through heating (such as during activation of the beads) which promotes thermal cyclicization reactions.

Some polymers may exhibit a satisfactory Ts but have poor solubility in the solvent used in the adsorbent dope. For example, they may require dangerous solvents or solvents that are difficult to manage in view of environmental regulation, or they may insoluble or only dissolve to an unsatisfactory extent and prevent bead formation through phase inversion. The three alternatives described immediately above provide a solution to this problem. This is because the polymer precursor or relatively low weight polymers are much more likely to exhibit satisfactory solubility in solvents typically used in fibers manufactured by phase inversion. Thus, the final polymeric binder (exhibiting the requisite Ts) is ultimately caused to be present in the beads but there is no problem of dissolution of the polymeric or monomeric content in the adsorbent dope.

The dissolved polymeric binder(s) is then mixed with an adsorbent in a powder form. The type of adsorbent is not limited and may include any of those known to those skilled in the art of adsorption-based liquid or gas separation. Typically, the adsorbent has a particle size of less than 1 μm and may be milled in order to achieve the desired size distribution.

The adsorbent dope may optionally be degassed under heat and/or vacuum prior to extrusion through a die or spinneret. The adsorbent dope is forced through a die or spinneret into a coagulant medium where the solvent(s) is removed from the adsorbent dope thus inducing the polymer matrix to solidify. The polymeric binder loading and amount of solvent are carefully controlled in order to produce a single phase that is close to binodal. That way, as the ejected bore fluid and extruded spin dope composition exit the spinneret and traverse through an optional air gap, solvent evaporating from the core spin dope composition either causes the exterior of the dope solution to solidify or brings it closer to solidification.

The coagulation bath (also known as the coagulant) constitutes a non-solvent or a poor solvent for the polymer while at the same time a good solvent for the solvent within the core spin dope composition. As the nascent fiber is plunged into a coagulant bath containing non-solvent, exchange of solvent and non-solvent from the fiber to the bath and vice-versa completes the solidification of the fiber to form a two-phase sub-structure of solid polymer and liquid solvent/non-solvent. In this manner, the liquid coagulant bath facilitates phase inversion (i.e., solidification) of the still-dissolved core spin dope polymer. In selecting an appropriate coagulant medium composition and temperature, the nature of the adsorbent dope may be considered. After coagulation, the resulting adsorbent/polymer matrix can be best described as an opened-cell structure. Specifically, the polymer matrix encapsulates the adsorbent particulates in an opened-cell structure or cage structure, without sticking to the adsorbent particles so as to promote good mass transport.

During the extrusion process, the solidified fiber may be pulled, for instance by pulling it onto and around a rotating barrel, so that the fiber coagulates under tension. Coagulating the adsorbent dope under tension can promote polymer chain alignment, thus creating additional hydrogen bonds and ultimately reinforcing the resulting adsorbent bead. One example of a polymeric binder exhibiting such alignment under tension is poly meta-aramids. The draw ratio may be adjusted, among other things, so as to create an opened fiber skin characterized by a relatively higher polymer content than at the fiber core. Such a skin mitigates the risk of dust formation while still allowing good mass transfer.

As seen above, the polymeric binder (exhibiting the requisite Ts) must be soluble in a solvent suitable for formation into beads via DIPS. Alternatively, the polymeric binder in the resultant beads must be able to be formed from its constituent precursor (via chain-lengthening as explained above) or monomers (via polymerization) after extrusion where the constituent precursor or monomers itself/themselves are soluble in a solvent suitable for formation into beads via DIPS. We have found that many polymers exhibiting the required Ts are not soluble enough to allow them to be formed by DIPS. Conversely, many polymers soluble enough to allow them to be formed by DIPS do not exhibit the required Ts. For those polymers that are soluble enough to allow formation of beads via DIPS and which exhibit the required Ts, many do not exhibit an elongation at break of at least 5%.

Now that DIPS has been described, we will proceed to describe formation of the bead by TIPS.

Those skilled in the art will understand that the beads may be formed by TIPS by heating the blend of polymeric binder(s) and adsorbent above the melting temperature of the polymeric binder, or in the case of two or more polymeric binders, above the melting temperature of the highest-melting point polymeric binder in the formulation. The blend of adsorbent and molten polymeric binder is then extruded through a spinneret in fiber form and the nascent fiber is allowed to traverse through a cooling medium such as water and/or air so that the nascent fiber solidifies. Because there is no need to dissolve the polymeric binder(s) in the formulation, there is no need for a solvent. Non-melting additives (from those described above) may be included in the formulation. By non-melting, we mean that they have a melting point higher than the temperature to which the formulation is heated and remain in a solid state during extrusion from the spinneret. The solidified fibers may be tensioned by pulling them around a rotating barrel.

Whether the beads are formed by DIPS or TRIPS, a structure suitable for performing adsorption-based separation may be formed by skeining the fibers, winding the fibers around a mandrel, weaving the fibers into a fabric, collecting a mass of the fibers are forcing the mass into a container, or pressing a mass of them into the form of a non-woven fabric. The type of adsorption-base gas separation process is not limited and includes pressure swing adsorption (PSA), temperature swing adsorption (TSA), vacuum swing adsorption (VSA), vacuum-pressure swing adsorption (VPSA), and electric swing adsorption (ESA). Such structures and processes may be stationary or mobile. While the structure used for adsorption-base separation is typically used for gas separations, it may also be used for vapor separations or condensed phase separations.

Multiple polymers or families of polymers may be considered for use as either the polymeric binder having the requisite Ts and elongation at break or in a blend of polymers whose combination exhibits the requisite Ts and elongation at break, including polyetherimides, polyimides, polyamides, polyamide-imides, polyaramids, ladder-type polymers, polybenzimidazole (PBI), polybenzoxazole (PBO), and polybenzothiazole (PBT).

A particularly suitable example of a polyimide is the polymer of formula (I) that is commercially available from Evonik Fibres GmbH under the trademark P84®.

(I)

P84 has a reported Tg of 315° C. and an elongation at break of 30%. Another particularly suitable polyimide is commercially available from Evonik Fibres GmbH under the trademark P84®NT. P84®NT has a reported Tg of 337° C., an elongation at break of 10%, and an HDT of 319-343° C.

Polyamide-imides exhibit satisfactory solubility in a variety of ordinary solvents and retain their toughness, high strength and high stiffness generally up to 275° C. A particularly suitable example of a polyamide-imide is the polymer of formula (II) that is commercially available from Solvay under trade name Torlon®. For example, one particular type of Torlon® (4203L) has a reported an elongation of 7.6%, an HDT of 278° C. (ASTM D648) and a Tg of 277° C. The structure of Torlon is according to formula (II):

Particularly suitable polyaramids include meta-aramids, examples of which include: MPD-I (poly m-phenylene isophthalamide) or MPD-IT (the condensation polymerization product of m-phenylenediamine (MPD), isophthaloyl chloride (I) and terephthaloyl chloride (T)). MPD-I is commercially available from DuPont under the trademark Nomex® and has the structure according to formula (III):

(III)

Nomex® has a reported $T_g$ of 230° C. and an elongation at break of 19-31.

Although it does not possess the requisite elongation at break, PBI (poly[2,2'-(m-phenylen)-5,5'-bisbenzimidazole]) may be used to increase the thermal resistance of other polymeric binders possessing a suitably high elongation at break (i.e., greater than 7%) and a Tg of at least 200° C. The structure of PBI is according to formula (IV):

(IV)

PBI has exceptional thermal and chemical stability and it exhibits an HDT of about 435° C. at 1.8 MPa as well as a $T_g$ of 427° C. and can be exposed to temperatures up to 540° C. PBI does not melt but degrades around 760° C. under pyrolysis. Given its relatively low elongation at breaks (3%), PBI alone, or with a filler, is best suited for solid/rigid monolith structures or beads as well as any structures that require only little flexibility (as opposed to fibers). Its thermal stability makes it a prime choice for 02 VSA using lithium based zeolite which requires activation temperatures in excess of 400° C. PBI can be used within blends to increase the temperature rating of less heat resistant polymers. For instance, without limiting the scope of the invention, PBI can be blended with polyetherimide (PEI) or polyamide-imide (PAI) so as to increase PEI's or PAI's Tg.

PBO (poly(p-phenylene-2,6-benzoxazole)) has the structure according to formula (V):

(V)

PBT (poly(p-phenylene-2,6-benzothiazole)) has the structure according to formula (VI):

(VI)

Examples of ladder-type polymers include benzimidazobenzo-phenanthroline-type ladder polymer (BBL) and its derivatives (e.g. BBL-N, BBL-P, BBL-DBF, BBL-AQ), polyhydroquinoxaline structures and semi-ladder polybenzimidazobenzophenanthroline (BBB). BBL has the structure according to formula (VII):

(VII)

As mentioned above, blends of polymeric binders may be envisioned for different purposes. Specifically, blends of polymers can be formulated so as to better tune the final polymer matrix properties. As previously mentioned, high-temperature rated polymers can be added to increase the thermal performance of a lower temperature rated thermoplastic polymer. For instance, 50 wt % PBI can be used in PAI so as to increase the Tg of PAI. Alternatively, permeable polymers can be added to non permeable polymers so as to improve gas diffusion. For instance, 20 wt % DAM-IT can be used in MPD-IT to favor gas transport as MPD-IT can be impermeable to gases.

The invention exhibits several advantages.

The present invention results in adsorbent structures that are relatively attrition resistant or dusting free. By using a polymeric binder or blend of polymeric binders, significant advantages over traditional clay-based binders are gained. Traditional clay-based binders are brittle and prone to dusting. In contrast, polymeric binders are more forgiving in terms of mechanical as well as thermal stress and provide great flexibility in forming, handling and operating methods. For instance, considering adsorbent beads with a polymeric binder, dusting can be eliminated or significantly reduced so that process schemes with circulating or fluidized adsorbent beds can be envisioned. Alternatively, depressurization and repressurization steps in large PSA systems can be shortened, thus shortening the cycle time and ultimately increasing the throughput of a given PSA.

The invention may be contrasted with the prior solutions.

In the past, multiple polymeric binders have been proposed to form various adsorbent structures. For instance, U.S. Pat. No. 6,451,723 discloses the use of polysulfone (PSU) to form mix-matrix 13X-PSU adsorbent structures. However, polysulfone (PSU) comes with a heat deflection temperature (HDT) of only 174° C. at 1.8 MPa and a glass transition temperature (Tg) of 185° C. These two parameters are important figures to look at—among others—as they offer insights on how the resulting adsorbent bed structures will handle mechanical load under temperature. Specifically, the HDT is the temperature at which a polymer sample deforms under a specified mechanical load. Indeed, as a thermoplastic polymer is exposed to increasing temperatures, its mechanical properties can weaken more or less abruptly close to the glass transition temperature (Tg). Regarding the latter, it is highly desirable to stay under the glass transition temperature of a given polymer in order to avoid/mitigate a collapse of the pore structures. Such a collapse will have detrimental impact on both adsorbent capacity and kinetics, especially when using impermeable polymers such as aramids.

U.S. Pat. No. 8,133,308 proposes to form a supported sorbent fiber. Specifically, a thin layer of a matrix adsorbent—cellulose acetate is deposited on the outside diameter of a non-sorbent hollow fiber. However, cellulose acetate (CA) comes with a heat deflection temperature (HDT) of only 86° C. at 1.8 MPa and 105° C. at 0.45 MPa as well as a glass transition temperature (Tg) of 130° C.

The foregoing described prior proposed thermoplastic polymers exhibit relatively low Tg's and are therefore not suitable for high-temperature activation/regeneration (e.g. >250° C.). In addition, considering large structured adsorbent systems of several cubic meters, the properties of the selected polymer as well as the constraints related to forming becomes critical as one has to look for additional key parameters (e.g. HDT, impact resistance) that are of no concern when making small size adsorbent structures (e.g. of a few liters).

U.S. Pat. No. 7,592,284 discloses the use of multiple generic polymer families, including thermoset and thermoplastic polymers. Thermoset polymers are typically obtained from a thermosetting resin, a pre-polymer in a soft solid or viscous state, which changes irreversibly into an infusible, insoluble polymer network by curing. During the curing, cross-linking reactions occur resulting in the forming of a rigid three dimensional polymeric structure. Curing can be induced by the action of heat. In contrast, the inventive beads do not thermally cross-link in the absence of a cross-linking agent and optional cross-linking promoter.

Although thermoset polymers generally speaking are better suited for high temperature requirements, the tuning of the resulting porosity can be challenging. Thermoset polymers can also emit VOCs, even after curing, which can be an issue for front end purification (FEP) processes upstream cryogenic processes as undesirable VOCs will condensate and accumulate on heat exchangers. Chemical resistance as well as impact resistance can also be a problem with thermoset polymers which can be brittle and therefore crack under mechanical or thermal stress. Such a scenario would negatively impact the performance of a monolithic bed as cracks would create preferential paths for the gas, thus leading to an early breakthrough.

In contrast to prior art solutions, the invention provides a solution of activation of many adsorbents having a high temperature activation. For example, some applications such as LiX based zeolite for N2/O2 separation or CO2 capture using NaX zeolite typically requires high temperature activations. For instance, LiX based zeolite can require activation up to 450° C. while NaX zeolite can require 330° C. activation so as to reach the full adsorbent capacity. The inventive beads not only accommodate high temperature requirements but also guarantee the structural and mechanical integrity of adsorbent systems.

Considering a 300° C. regeneration event on an axial-flow-configured TSA of an ASU, heat is brought to the bed from say the top of the bed and the temperature is measured/monitored at the other end of the bed, in this case, the bottom. Depending on the heat ramp protocol, the top end of the bed can be subjected to hours-long high-heat events while the bottom end may see shorter high-heat events. Therefore, the inventive beads provide an adsorbent system solution that exhibits high-heat resistance over several hours and will withstand long enough the necessary activation/regeneration temperature.

EXAMPLES

Example 1: Making and Characterization of NaX-MPDIT Beads for $CO_2$

High temperature adsorbent bead have been prepared by first putting 20 wt % of MPD-IT in NMP solvent without salt. Next, adsorbent powder of sodium based 13X zeolite commercially available was added to the dope so that once coagulated, the adsorbent beads would be loaded with 87 wt % of zeolite. Specifically, the zeolite powder was mixed with the dope using a high speed mixer and then let degassed.

The resulting beads were then washed in methanol, air dried at room temperature and finally activated at 275° C. The resulting CO2 isotherm was generated and compared to a benchmark (commercial beads).

Figure 1:
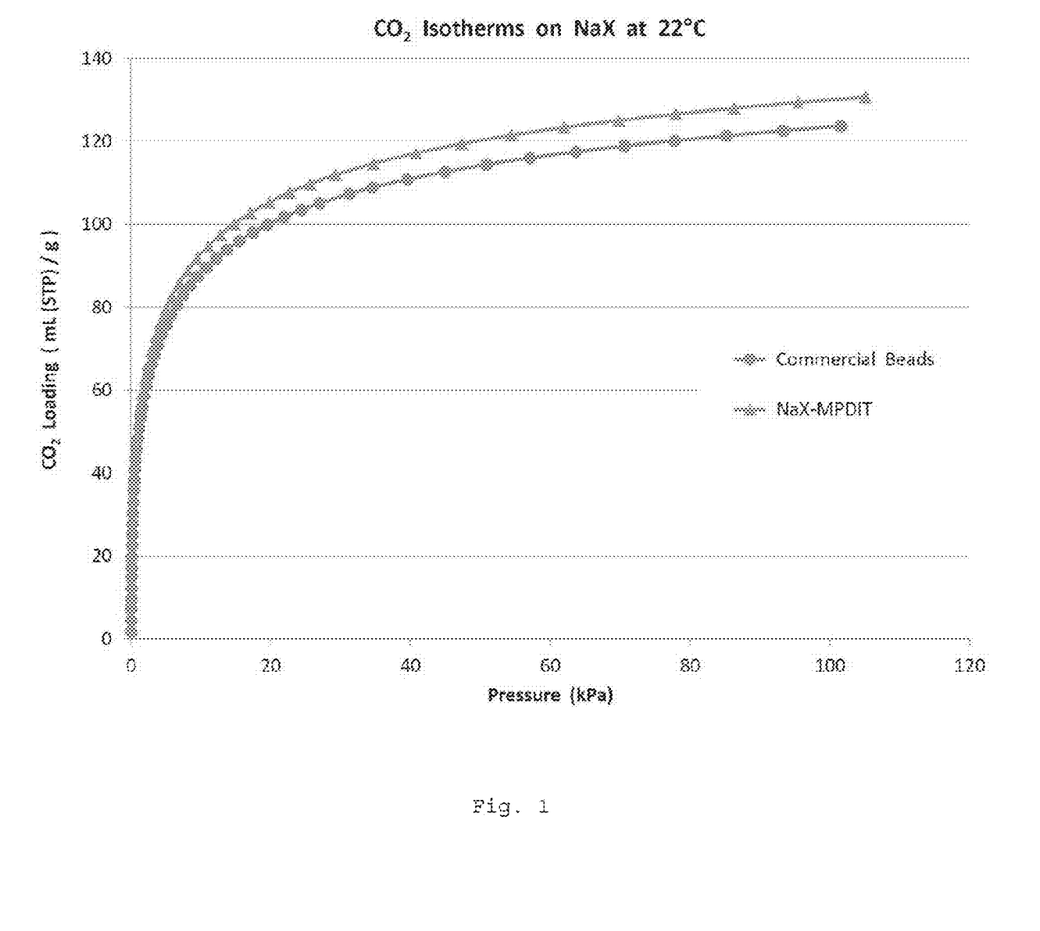
FIG. 1 is a graph of the $CO_2$ isotherms on 13X-MPDIT beads vs. the $CO_2$ isotherms for commercial beads.

FIG. 1 is a graph of the $CO_2$ isotherms on 13X-MPDIT beads vs. the $CO_2$ isotherms for commercial beads. The beads were activated at 275° C. whereas the commercial beads were activated at 330° C. Both isotherms were generated at 22° C.

Example 2: Making and Characterization of LiX-PBI Beads for $N_2$

High temperature adsorbent beads were prepared by first putting 15 wt % of FBI in DMAc solvent without salt. Next, adsorbent powder of sodium based 13X zeolite commercially available was added to the dope so that once coagulated, the adsorbent beads would be loaded with 88 wt % of zeolite. Specifically, the zeolite powder was mixed with the dope using a high speed mixer and then let degassed. The resulting beads were then washed multiple times in DI-water charged with a lithium salt so as to transform the NaX into LiX zeolite. Finally, the beads were washed in methanol, air dried at room temperature and activated at up to 400° C. Specifically, a first $N_2$ isotherm was carried out after a 300°

C.-activation step. A second N$_2$ isotherm was carried out after a 400° C.-activation step. Both N$_2$-isotherms were carried out at 22° C.

Figure 2:
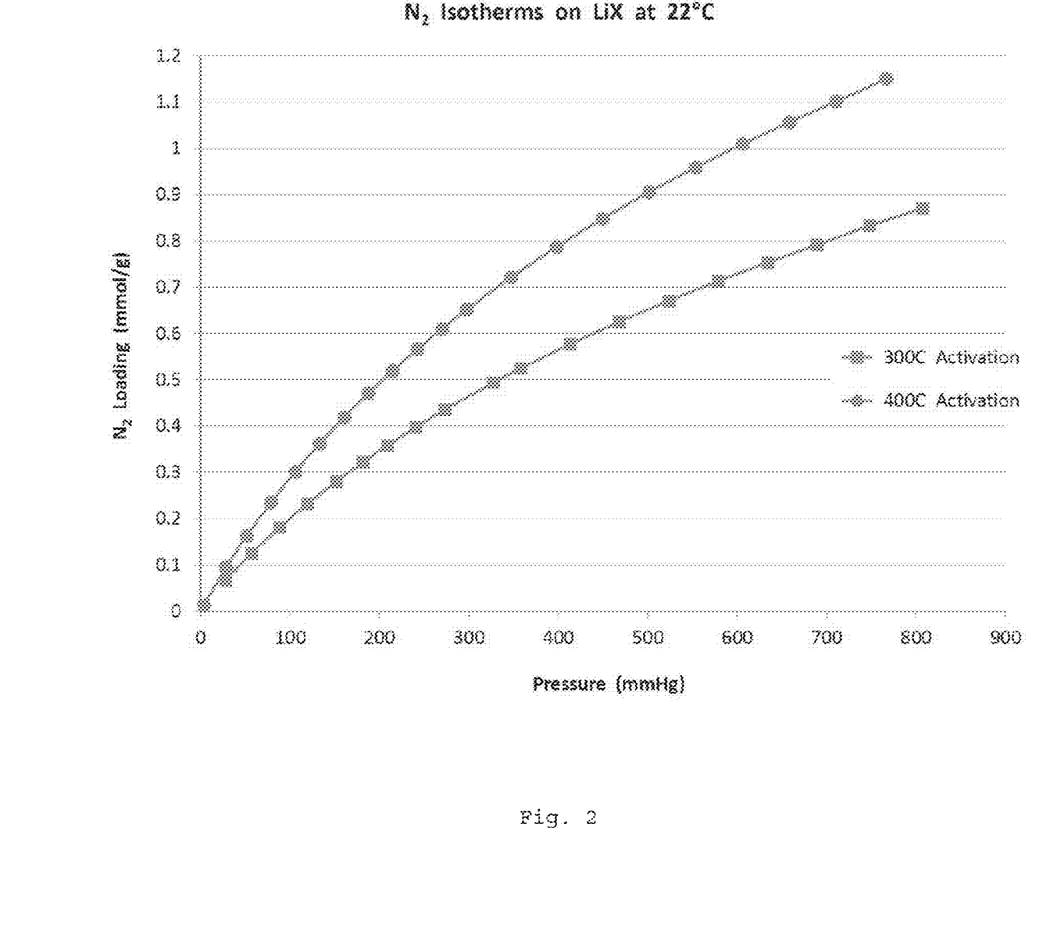
FIG. 2 is a graph of the $N_2$ isotherms on LiX-PBI beads after 300° C. & 400° C.

FIG. 2 is a graph of the N$_2$ isotherms on LiX-PBI beads after 300° C. & 400° C. activation illustrating the necessity of high temperature activation in order to reach the full N$_2$ capacity of the LiX zeolite.

What is claimed is:

1. A bead comprised of a non-flexible polymer-adsorbent matrix suited for high-temperature exposure requirement produced by diffusion-driven phase inversion using a soluble thermoplastic polymers or a blend of thermoplastic polymers that can withstand high temperature exposure at or above 240° C. for at least 5 hours, the beads containing at least 50 wt % adsorbent.

2. A bed of the bead of claim 1.

3. The bead of claim 1, wherein the thermoplastic polymer or the blend of thermoplastic polymers are soluble rigid chain polymers selected from the group consisting of: Polyaramids (MPD-I, MPD-IT, DAM-IT), FBI, PBT, PBO, PAI, PEI+derivatives and/or precursors and/or blends, and soluble ladder type polymers: BBL.

* * * * *

UNITED STATES PATENT AND TRADEMARK OFFICE
CERTIFICATE OF CORRECTION

Page 1 of 1

PATENT NO. : 10,315,184 B2
APPLICATION NO. : 15/396644
DATED : June 11, 2019
INVENTOR(S) : Philippe A. Coignet et al.

It is certified that error appears in the above-identified patent and that said Letters Patent is hereby corrected as shown below:

In the Claims

Column 17, Claim 3, Line 20, replace "FBI" with --PBI--.

Signed and Sealed this
Fifteenth Day of October, 2019

Andrei Iancu
*Director of the United States Patent and Trademark Office*